(12) United States Patent
Lin et al.

(10) Patent No.: US 11,130,109 B2
(45) Date of Patent: Sep. 28, 2021

(54) APPARATUS AND METHOD FOR MAKING SPHERICAL CATALYST BEADS

(71) Applicant: BEIJING SANJU ENVIRONMENTAL PROTECTION & NEW MATERIALS CO., LTD, Beijing (CN)

(72) Inventors: Ke Lin, Beijing (CN); Carol A Ellis-Terrell, Schertz, TX (US); Ronghua Wei, San Antonio, TX (US)

( * ) Notice: Subject to any disclaimer, the term of this patent is extended or adjusted under 35 U.S.C. 154(b) by 583 days.

(21) Appl. No.: 16/038,167

(22) Filed: Jul. 17, 2018

(65) Prior Publication Data

US 2020/0023326 A1    Jan. 23, 2020

(51) Int. Cl.

| | |
|---|---|
| *B01J 2/06* | (2006.01) |
| *B01J 2/20* | (2006.01) |
| *B01J 21/04* | (2006.01) |
| *B01J 35/08* | (2006.01) |
| *B01J 37/00* | (2006.01) |
| *B01J 35/02* | (2006.01) |

(52) U.S. Cl.
CPC . *B01J 2/06* (2013.01); *B01J 2/20* (2013.01); *B01J 21/04* (2013.01); *B01J 35/023* (2013.01); *B01J 35/08* (2013.01); *B01J 37/0072* (2013.01)

(58) Field of Classification Search
CPC ......... B01J 2/02; B01J 2/06; B01J 2/20; B01J 21/02; B01J 21/04; B01J 35/023; B01J 35/026; B01J 35/08; B01J 37/0072; B01J 37/0215; B01J 37/0221; B01J 37/0225; C01F 7/025
See application file for complete search history.

(56) References Cited

U.S. PATENT DOCUMENTS

| | | | |
|---|---|---|---|
| 125,406 | A | 4/1872 | Percy |
| 2,620,314 | A | 12/1952 | Hoekstra |
| 4,628,040 | A | 12/1986 | Green et al. |
| 6,797,203 | B2 | 9/2004 | Vlach et al. |
| 8,256,091 | B2 | 9/2012 | Duescher |
| 9,108,880 | B2 | 8/2015 | Jin et al. |
| 9,823,174 | B2 | 11/2017 | Kota et al. |
| 2014/0011013 | A1 | 1/2014 | Jin et al. |
| 2014/0023852 | A1 | 1/2014 | Bower et al. |
| 2015/0375429 | A1* | 12/2015 | Butt .......................... B01J 2/04 427/457 |
| 2016/0128193 | A1* | 5/2016 | Duncan ............... H01L 25/0657 361/790 |
| 2016/0339625 | A1 | 11/2016 | Mead et al. |
| 2017/0260420 | A1 | 9/2017 | Castano Meneses |

* cited by examiner

*Primary Examiner* — Brian A McCaig (74) *Attorney, Agent, or Firm* — W&K IP (57) ABSTRACT

Apparatuses and methods for making uniform spherical beads are disclosed. Specifically, the uniform spherical beads are made by dropping droplets on a droplet rolling part, creating beads by rolling the droplets on the droplet rolling part from one spot to another spot, and collecting the beads by a beads collector.

9 Claims, 6 Drawing Sheets

APPARATUS AND METHOD FOR MAKING SPHERICAL CATALYST BEADS

TECHNICAL FIELD

This disclosure relates to the production of uniform spherical (ball shaped) catalyst beads and more particularly to apparatuses and methods for making uniform spherical beads with super-omniphobic (super omniphobic° coated plates.

BACKGROUND OF THE PRESENT INVENTION

The bead forming material is typically a hydrosol, or slurry containing silica, alumina, or silica-alumina. The beads are typically metal oxides which are used as a catalyst, a catalyst support, or matrix, an adsorbent, or an ion exchange material. Generally, catalytic processes such as gas-liquefaction require large surface areas of the reactor to be covered with catalyst material. Uniform spherical catalyst beads have the potential to offer a large surface area for which chemical reactions can take place. Therefore uniform spherical catalysts are desired in catalytic processes.

Spherical catalyst beads have many advantages over other shapes because they permit uniform packing so that variations in pressure drop are minimized and the tendency of a reactant stream to channel through the bed out of effective contact with the catalyst is reduced. Better flow properties, in the case of a moving bed system, are produced.

There are at least six different techniques (crushing, spraying drying, granulation, tabletting, extrusion, oil drop) for generating spherical catalyst beads. Two of the commonly used methods that are manufactured from a liquid process are known as spray drying and oil drop method.

The spray drying technique, described in U.S. Pat. No. 125,406, suspends a powder in water creating slurry that is sprayed through a nozzle to produce small droplets of particles into hot air. While this technique is good for particles less than 1 mm in diameter, it is unsuitable for macro-size particles around 1 mm to 13 mm in size.

The oil drop method, U.S. Pat. No. 2,620,314, drips a small, controllable amount of catalysts solution such as alumina hydrosol with an internal gelling agent (hexamethylenetetramine) into a hot oil bath. The hot oil bath consists of heavy or light oil and is contained within a column or pan. Since the droplet consist primarily of water, it is insoluble in oil, and draws up into a sphere. The hydrogel sphere then gravitates to the bottom of the oil bath and is progressively gelled to maintain structural integrity of the sphere. The hydrogel sphere is later aged in hot oil, then washed, dried and calcined at temperatures of 425° C. to 750° C. The droplet prior to immersion in the oil is an irregularly shaped; non-uniform sized particles, and only assumes the shape of spheres in the hot oil bath due to forces of surface tension. The spherical-catalyst beads produced from this method are usually non-uniform, small in size.

An alternative to the oil drop bath, U.S. Pat. No. 4,628,040, eliminates the oil bath and makes uniform spherical catalyst beads using capillary tube, venturi and an immiscible fluid such as gas, or oil. Uniform droplets of metal/metalloid oxide slurry are produced by placing the end of the capillary tube, at the throat of a venturi. An immiscible fluid flows through the venturi and detaches the droplets from the end of the capillary tube producing uniform spherical droplets that are harden into spherical beads.

There are other patents that have made enhancements to these techniques (U.S. Pat. No. 6,797,203) which flows an aqueous ceramic slurry into a nozzle tip immersed in a water-immiscible fluid to generate spherical beads. U.S. Pat. No. 8,256,091 uses screen sheets with precisely sized spherical cell cavities, where a volumetric size of a liquid suspension is released into the cell with a fluid that can expel the entire spherical liquid-suspension into the environment for further modification such as hardening. However, none have used a super-omniphobic coated plate to generate spherical beads. Super-omniphobicity is used to describe surfaces that are repellent to both high and low surface tension liquids (oils.).

SUMMARY OF PRESENT INVENTION

A first aspect of the disclosure pertains to an apparatus for making spherical beads from a liquid suspension comprising a droplet generating device for generating droplets; a droplet rolling part comprising at least one omniphobic-coated plate; and a beads collector. The droplet rolling part and the beads collector are positioned such that the droplets move from one spot of the droplet rolling part to another spot before reaching the beads collector. Preferably, the at least one omniphobic-coated plate comprises a super-omniphobic coating on the surface.

Another aspect of the disclosure pertains to a method of making spherical beads from a liquid suspension, the method comprising supplying droplets of a liquid suspension; dropping the droplets on a droplet rolling part, wherein the droplet rolling part comprises at least one omniphobic-coated plate; creating beads by rolling the droplets on the droplet rolling part from one spot to another spot; and collecting the beads by a beads collector.

The beads have an average diameter in a range of 100 microns (μm) to 12 millimeters (mm).

The methods according to the present disclosure are advantageous. Compared to the current methods, the omniphobic-coated plate method can significantly reduce the cost and improve the uniformity of beads.

The present invention provides methods of making spherical catalyst beads. Uniform droplets of a bead-forming liquid are generated by a droplet generating device containing a liquid suspension, and the tip of said droplet generating device is positioned on the top of the inclined super-omniphobic coated plate. The droplets roll on the inclined super-omniphobic coated plate to harden. Due to the low surface energy of the super-omniphobic coating, the droplet/liquid/suspension does not adhere to the super-omniphobic coated plate surface and retains the droplet spherical shape in air, prior to hardening. With a slight tilt of the plate, the droplet rolls to produce a nearly spherical shaped and uniform catalyst bead, comprised of a homogenous catalytic metal. By varying the volume of droplet of bead-forming liquid, the size of the beads can be adjusted.

BRIEF DESCRIPTION OF THE DRAWINGS

The accompanying figures, which are incorporated in and constitute a part of this specification, illustrate several embodiments described below.

DETAILED DESCRIPTION OF THE INVENTION

Before describing several exemplary embodiments, it is to be understood that the disclosure is not limited to the details of construction or process steps set forth in the following disclosure. The disclosure provided herein is capable of other embodiments and of being practiced or being carried out in various ways.

Embodiments of the present disclosure provide apparatuses and methods for making spherical beads, preferably spherical catalytic beads, having an average diameter in a range of 100 microns (μm) to 12 millimeters (mm).

Figure 1:
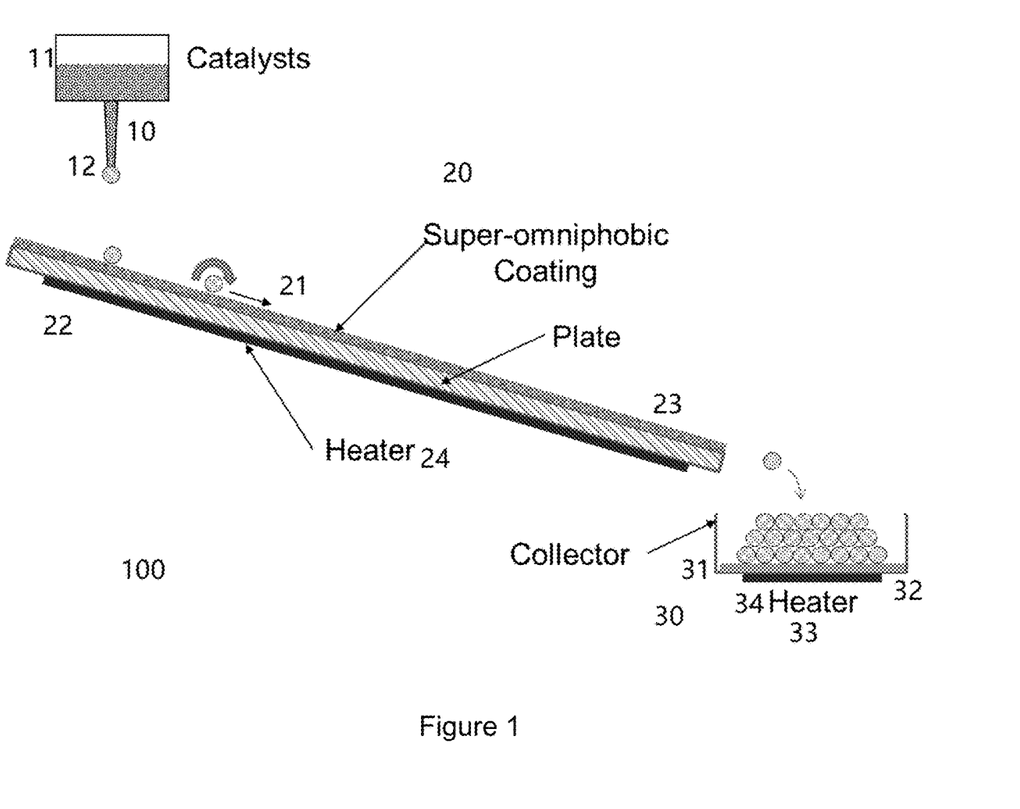
FIG. 1 illustrates embodiments of an apparatus for making spherical catalyst beads including heating elements.

FIG. 1 is a brief schematic of an apparatus 100 for making spherical beads. The apparatus 100 has three parts. The first part is the droplet generating device 10. The droplet generating device 10 includes a fluid reservoir 11, and a tip 12, from which the droplets can be dispensed. In some examples, the droplet generating device 10 is a micropipette, from which droplets of micro-liter volume are dispensed through the pipette tip.

The second part is a droplet rolling part 20, which includes at least one omniphobic-coated plate 21. As used herein, the term "omniphobic" means repellent to both watery and oily liquids. The omniphobic-coated plate 21 can have three layers: a metal panel 22 (such as an Aluminum plate), a omniphobic coating layer on the surface of the metal panel 23, and at least one heating element attached to the other surface of the metal panel 24. In some examples, the at least one omniphobic-coated plate 21 is inclined, and the angle between the at least one omniphobic-coated plate 21 and the horizontal plane can be between 0 and 90 degrees. In some other examples, the droplet rolling part is heated to a temperature not capable of causing deformation of the omniphobic coating layer 23. The temperature is preferably between about 80° C. and about 120° C. In another example, the omniphobic coating layer is a super-omniphobic coating layer. As used herein, the term "super-omniphobic" means superhydrophobic (offering low surface tension), superoleophobic, thermal stable and durable. The coatings superhydrophobicity provides the surface with a low surface energy, so that the water based suspension will not stick to it. Similarly, an oil-based liquids suspension will not adhere to the super-oleophobic surface. In certain examples, the terms "omniphobic" and "super-omniphobic" have the same meaning and can be used interchangeably. The omniphobic or super-omniphobic coating layer can withstand a temperature without deformation of at least 100° C.

The third part is a beads collector 30, which includes a omniphobic-coated plate 31 for collecting the spherical beads 32. The omniphobic-coated plate 31 has three layers: a metal panel 32 (such as an Alumina plate), a omniphobic coating layer 33 on the surface of the metal panel, and at least one heating element 34 attached to the other surface of the metal panel.

A liquid suspension containing a solvent and at least one metal/metalloid oxide compound such as aluminum hydroxide or silicon oxide, serving as a catalyst or catalyst carrier, is dispensed dropwise onto the heated omniphobic-coated plate 21 to form hardened spherical beads. The liquid suspension may also comprise other metal/metalloid oxide, or carbonate compounds, such as calcium carbonate, titanium dioxide, and aluminum silicate. A omniphobic coating layer 23 can prevent the liquid droplets from adhering to the plate surface and retain the droplets spherical shape in air, prior to hardening. With a slight tilt of the plate, the droplets roll to produce nearly spherical shaped and uniform catalyst beads comprising of the at least one metal/metalloid oxide compound or carbonate compounds. It should be pointed out that the disclosed methods can be applied to manufacture other spherical particles such as catalytic carriers, abrasives, or adsorbents with metal/metalloid oxide, or carbide compound.

The liquid catalyst suspension is stored in the fluid reservoir 11. When the apparatus is in use, the droplets are formed and dropped from the tip of the tip 12. In some examples, the droplets drop on one spot of the droplet rolling part 20. The droplets then move to another spot of the droplet rolling part 20 before dropping onto the beads collector 30. When the omniphobic-coated plate 21 is inclined, gravity can drive the movement of the droplets. In other examples, the droplets can move by other mechanisms, e.g., by vacuum force, blowing, or through a mechanical movement. The vertical distance between the tip 12 and the dropping position of the omniphobic-coated plate 21 is between 0 to 3 centimeters. The liquid droplets then roll along the length of the plate into the collector plate. During the rolling, the liquid encompassing the droplets is evaporated, and the droplets form dried spherical beads. The spherical beads are accumulated in the beads collector 30. The beads collector 30 is preferably heated for further drying and collection. The rolling time can be adjusted by adjusting the vertical distance and/or the angle between the omniphobic-coated plate 21 and the horizontal plane.

In some embodiments, the beads collector 30 is a part of the droplet rolling part 20, wherein the omniphobic-coated plate 21 comprises an inclined part for rolling the beads and a horizontal part for collecting the beads.

Figure 2A:
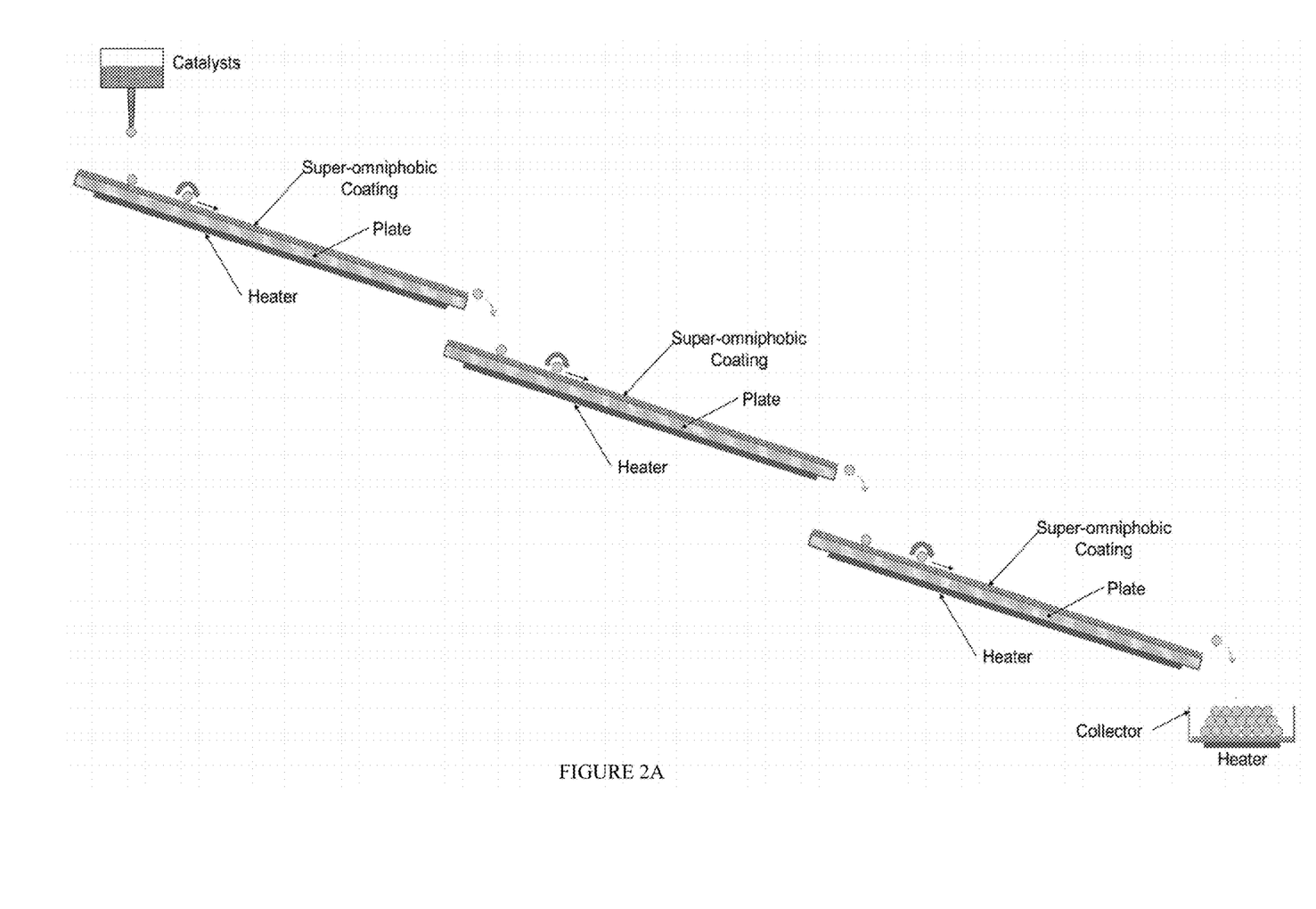
FIGS. 2A-2C illustrate embodiments of an apparatus including a droplet rolling part of: (A) three omniphobic-coated plates, (b) funnel design, and (c) spiral design.
Figure 2B:
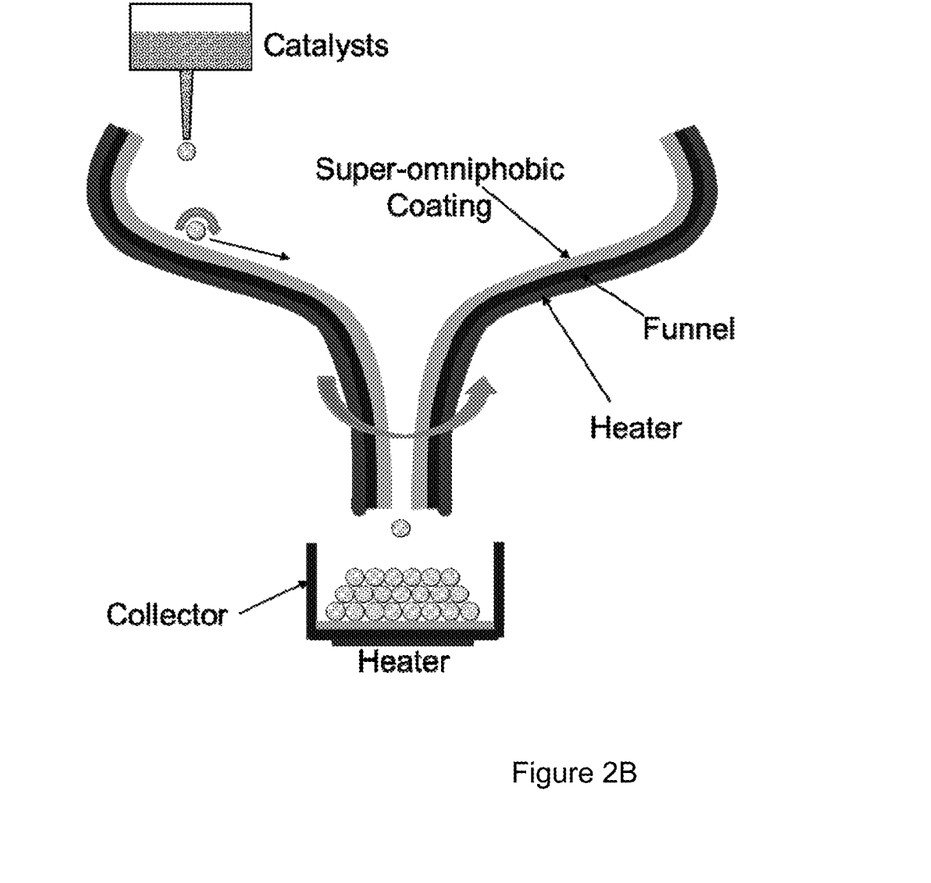
Figure 2C:
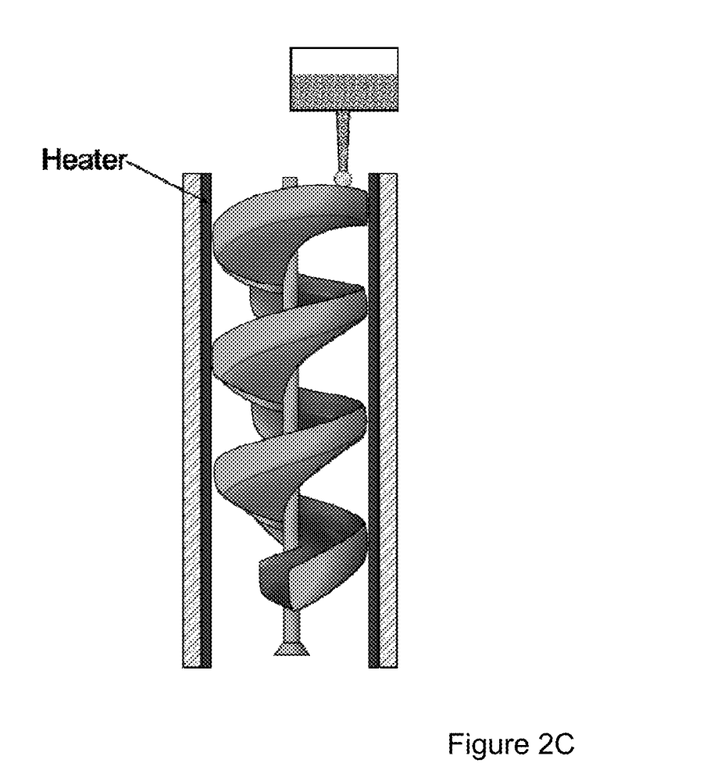
Figure 3:
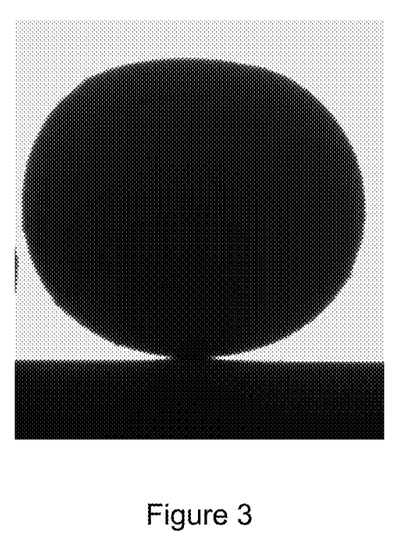
FIG. 3 illustrates the spherical Aluminum catalyst beads formed according to some embodiments of the present disclosure.

FIGS. 2A-2C illustrate various embodiments of the droplet rolling part 20. In FIG. 2A, the droplet rolling part 20 has three omniphobic-coated plates 21a, 21b, and 21c. In some examples, the three omniphobic-coated plates have different tilt angles in order to adjust the droplet rolling speed or for other purposes. FIGS. 2B and 2C illustrate two more configurations of the droplet rolling part 20. FIG. 2B is a funnel structure, wherein the omniphobic coating layer 23 is on the funnel inside surface. The beads collector 30 is placed under the stem of the funnel. The at least one heating element is outside of the funnel. Similarly, FIG. 2C illustrates a spiral structure located in a temperature controlled chamber.

According to one or more embodiments, the omniphobic-coated plate can be made by coating an omniphobic material on the metal panel. US Patent Pub. Nos. 20170260420, 20160339625, 20140023852, and 20140011013, and U.S. Pat. Nos. 9,823,174 and 9,108,880, and pending U.S. patent application Ser. No. 15/891,870 provide methods to make the omniphobic coating layer and the omniphobic-coated plate.

The disclosure also provides methods of making spherical beads. In one or more embodiments, the method comprises supplying droplets of a liquid suspension; dropping the droplets on one spot of a droplet rolling part; creating beads by rolling the droplets on the droplet rolling part from one spot to another spot; and collecting the beads by a beads collector. In some embodiments, the droplet rolling part comprises at least one omniphobic-coated plate. In some further embodiments, the rolling step further comprises heating the droplet rolling part. The temperature can be between 80° C. and 120° C. In still further embodiments, the beads collector is heated to a temperature between 80° C. and 120° C. Heating can evaporate water in the droplets and facilitate hardening of the droplets to form beads. The beads have an average diameter in a range of 100 microns (μm) to 12 millimeters (mm).

Embodiment 1

A super-omniphobic coating was coated on aluminum (Al) plates as shown in FIG. 2. The super-omniphobic coating plates are prepared using the method disclosed in the co-pending patent application Ser. No. 15/891,870. The plates were heated to an average temperature of 90° C. (temperature range of 85-95° C.) by the heating elements before making spherical catalyst beads. The liquid catalyst suspension comprised $AlO_2$, hexamethylenetetramine for gelling, and water. An automated micro-pipette dispensing systems pipette tip was used as the droplet generating device. The droplet was about 10 μl of the liquid catalyst suspension ($AlO_2$). After dropping, the $AlO_2$ liquid catalyst suspension droplet traveled vertically about 1-13 cm to the dropping position on the super-omniphobic coated plate, rolled down through the super-omniphobic coating plates, and dropped into the beads collector.

Figure 4:
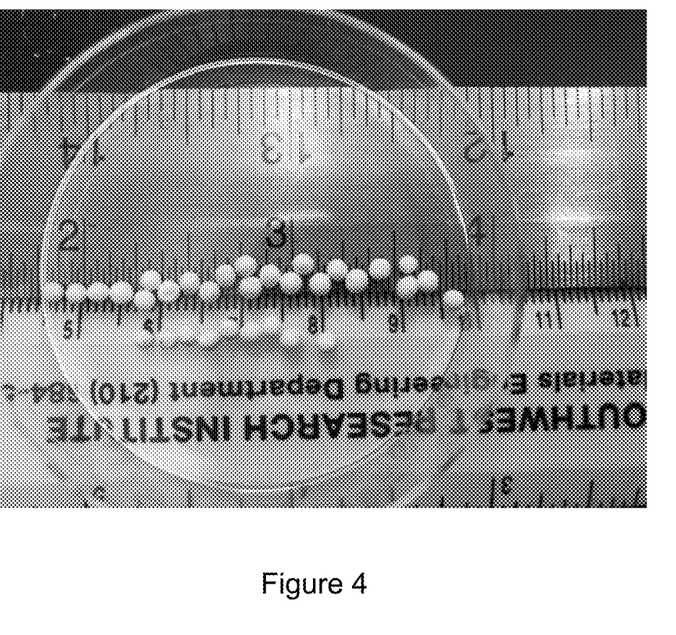
FIG. 4 illustrates the spherical aluminum oxide beads formed according to some embodiments of the present disclosure.

The low surface energy of the super-omniphobic coating resulted in the liquid catalyst suspension forming and retaining its spherical shape along the plate. The water used in the $AlO_2$ liquid catalyst suspension was slowly evaporated off by the heated plates, and the $AlO_2$ catalyst material solidified into nearly uniform spherical beads. The average diameter of the 10 μl solution of $AlO_2$ liquid catalyst suspension was about 3.55 mm. 10 μl solution of $AlO_2$ liquid catalyst suspension formed a 2.67 mm diameter uniform sphere after drying. An image of a sphere is shown in FIG. 4. The catalyst beads dried/gelled within at least two to five minutes after dropping. Additional heat treatment such as calcination was needed to fully harden the beads. FIG. 5 shows the spherical catalyst beads Embodiment 2

The plates were heated to an average temperature of 90° C. by the heating elements before making spherical catalyst beads. The droplets were each about 5 μl of the liquid catalyst suspension ($AlO_2$). The average diameter of the 5 μl solution of $AlO_2$ liquid catalyst suspension was about 2.77 mm. 5 μl solution of $AlO_2$ liquid catalyst suspension formed a 2.02 mm diameter uniform sphere after drying.

Embodiment 3

The plates were heated to an average temperature of 90° C. by the heating elements before making spherical catalyst beads. The droplets were each about 2.5 μl of the liquid catalyst suspension ($AlO_2$). The average diameter of the 2.5 μl solution of $AlO_2$ liquid catalyst suspension was about 2.14 mm. 2.5 μl solution of $AlO_2$ liquid catalyst suspension formed a less than 2 mm diameter uniform sphere after drying.

Embodiment 4

The plates were heated to an average temperature of 90° C. by the heating elements before making spherical catalyst beads. The droplets were each about 1 μl of the liquid catalyst suspension ($AlO_2$). The average diameter of the 1 μl solution of $AlO_2$ liquid catalyst suspension was about 1.54 mm. 1 μl solution of $AlO_2$ liquid catalyst suspension formed a less than 1 mm diameter uniform sphere after drying.

The diameter of spherical catalyst beads

| Liquid catalyst suspension Volume (μL) | Diameter (liquid $AlO_2$ sol) (mm) | Diameter (solid $AlO_2$) (mm) |
| --- | --- | --- |
| 10 | 3.55 | 2.67 +/− 0.176 |
| 5 | 2.77 | 2.02 +/− 0.04 |
| 2.5 | 2.14 | <2.00 |
| 1 | 1.54 | <1.00 |

We claim:

1. An apparatus for making spherical beads from a liquid suspension, comprising:
    a droplet generating device for generating droplets, comprising a fluid reservoir and a tip;
    a droplet rolling part comprising at least one omniphobic-coated plate and at least one heating element, wherein the droplet rolling part is heated to a temperature between about 80° C. and about 120° C., the droplet rolling part has a funnel design or spiral design; and
    a beads collector comprising at least one heating element, wherein the beads collector is heated to a temperature between 80° C. and 120° C.;
    wherein the droplets move from one spot of the droplet rolling part to another spot before reaching the beads collector.

2. The apparatus according to claim 1, wherein the size of the droplets is adjustable by adjusting the volume of the liquid suspension in the droplet generating device.

3. The apparatus according to claim 1, wherein the at least one omniphobic-coated plate comprises a super-omniphobic coating layer on the surface.

4. The apparatus according to claim 1, wherein the at least one omniphobic-coated plate is superhydrophobic and superoleophobic.

5. The apparatus according to claim 1, wherein the beads collector comprises a omniphobic-coated plate for collecting spherical beads.

6. A method of making spherical beads from a liquid suspension, comprising:
    supplying droplets of a liquid suspension;
    dropping the droplets on one spot of a droplet rolling part, wherein the droplet rolling part comprises at least one omniphobic-coated plate and at least one heating element;
    creating beads by rolling the droplets on the droplet rolling part from one spot to another spot, wherein the droplet rolling part is heated to a temperature between about 80° C. and about 120° C., the droplet rolling part has a funnel design or spiral design; and
    collecting the beads by a beads collector comprising at least one heating element, wherein the beads collector is heated to a temperature between 80° C. and 120° C.

7. The method according to claim 6, wherein the beads have an average diameter in a range of 100 microns (μm) to 12 millimeters (mm).

8. The method according to claim 6, wherein the at least one omniphobic-coated plate comprises a super-omniphobic coating on the surface.

9. The method according to claim 6, wherein the at least one omniphobic-coated plate is superhydrophobic and superoleophobic.

\* \* \* \* \*